Patented Jan. 18, 1949

2,459,420

UNITED STATES PATENT OFFICE 2,459,420

β-AMINO-α-CHLOROACRYLONITRILES AND METHODS OF PREPARATION

John G. Erickson, Greenwich, Conn., assignor to American Cyanamid Company, New York, N. Y., a corporation of Maine No Drawing. Application August 7, 1947, Serial No. 767,345

7 Claims. (Cl. 260—465)

The present invention relates to β-amino-α-chloroacrylonitriles which conform to the general formula

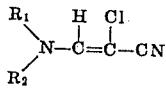

wherein $R_1$ and $R_2$ are chosen from the group consisting of hydrogen, alkyl, aryl and combinations thereof and to methods of producing the same.

It has been discovered that a substituted acrylonitrile of the above formula may be obtained by causing α,β-dichloroacrylonitrile to react with an ammonia base of the formula

in which $R_1$ and $R_2$ have the meaning shown above.

The said ammonia bases having at least one hydrogen atom connected to nitrogen include ammonia and the primary and secondary aliphatic and aromatic amines. Specific examples of the amines are the methyl, ethyl, propyl, butyl, hexyl, octyl, dodecyl, octadecyl and cyclohexyl amines, diethyl amine, dibutyl amine, di(2-ethylhexyl)amine, aniline, toluidine, methyl aniline, propyl aniline and the like.

The reaction is preferably carried out in the presence of a solvent or diluent, such as the aliphatic, cycloaliphatic or aromatic hydrocarbons, halogenated aliphatic hydrocarbons, such as carbon tetrachloride or ethylene chloride, mono or polyhydric alcohols, ethers such as diethyl ether or dioxane, ethers of polyhydric alcohols such as the ethylene glycol mono-alkyl ethers and similar inert organic solvents.

The reaction usually takes place at from room temperature to not exceeding about 100° C. When amines of high molecular weight are employed, the temperature may be further increased.

It is advantageous to carry out the reaction employing approximately two molecular proportions of ammonia base to one molecular proportion of dichloroacrylonitrile as illustrated by the following equation

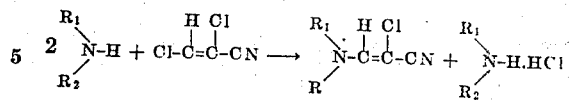

Hence, one half of the ammonia base functions as an acceptor for the hydrogen chloride liberated in the reaction. The thus formed hydrogen chloride salt is easily removed by filtration. When employing an amine in the process, the recovered amine salt may be neutralized and the free amine utilized in a subsequent run.

Agents other than the ammonia base which serve as the hydrogen chloride acceptor include the tertiary amines, for example, triethyl amine, tributyl amine, dimethyl aniline and the like. For instance, the process may be readily operated employing equimolecular proportions of a tertiary amine, the ammonia base and α,β-dichloroacrylonitrile.

The following examples will further illustrate the nature of this invention.

Example 1

100 g. of saturated methanolic ammonia (18.3% $NH_3$) and 50 cc. of methanol were thoroughly mixed together. To this mixture with good stirring, there was added a solution of 36.6 g. of α,β-dichloroacrylonitrile in 50 cc. of methanol during a period of 1½ hours. The reaction was exothermic but not vigorous, the temperature of the mixture being easily kept at 25° C. by occasional applications of an ice bath. After standing overnight, the reaction mixture was cooled in an ice bath and the ammonium chloride filtered off. The filtrate was concentrated under reduced pressure and the residue was dissolved in 150 cc. of benzene and filtered. The benzene filtrate was distilled under vacuum giving 25.5 g. of a light-colored liquid boiling at 95°–120° C./5 mm. Redistillation of the crude product gave β-amino-α-chloroacrylonitrile boiling at 101.5–102.5° C./4 mm. Upon cooling to room temperature, the product crystallized to a white solid which melted at 40°–43° C.

Example 2

48.8 g. of α,β-dichloroacrylonitrile were added during a period of 1 hour to a solution of 62 g.

of butyl amine in 200 cc. of benzene. The solution became warm and reached a temperature of about 60° C. The mixture was allowed to stand for 24 hours, and filtered. The filtrate was washed with two 100 cc. portions of water, and then distilled under reduced pressure. 58.5 g. (92% yield) of β-butylamino-α-chloroacrylonitrile were obtained. The product was a colorless liquid boiling at 82° C./0.5-1.0 mm., and having a refractive index $n_{25}^D$ 1.5236

*Example 3*

27 g. of α,β-dichloroacrylonitrile were added dropwise to a mixture of 32 g. of decyl amine, 20 g. of pyridine and 50 cc. of methanol. The mixture heated up slightly and a yellow color developed which later became dark red. After standing overnight, the reaction mixture was poured into 400 cc. of water, which was then extracted with 300 cc. of benzene. The benzene extract was washed with 50 cc. of water, and distilled. 30.2 g. of α-chloro-β-decylaminoacrylonitrile were obtained as a light yellow liquid boiling at 179°-180° C./1 mm., and having a refractive index $n_{25}^D$ 1.5018

*Example 4*

54 g. of α,β-dichloroacrylonitrile were added dropwise during a period of 45 minutes to a mixture of 74 g. of dodecyl amine, 39.5 g. of pyridine and 100 cc. of ethanol. The reaction was vigorous at first, the temperature being held at 30°-35° C. by the use of a cold water bath. After standing for 3 days at room temperature the mixture was poured into 400 cc. of water, followed by extraction with 300 cc. of benzene. The benzene solution was washed with several portions of water, and then distilled. The α-chloro-β-dodecylaminoacrylonitrile was obtained in good yield as a yellow liquid boiling at 175°-185° C./1 mm. Upon cooling to room temperature, the product crystallized to a white solid which after recrystallization from ethyl acrylate melted at 37°-40° C.

*Example 5*

55 g. of α,β-dichloroacrylonitrile were added during a period of 2 hours to a stirred mixture of 51.6 g. of dibutyl amine, 50.5 g. of triethyl amine and 100 cc. of methanol. The temperature of the mixture was held at 20°-30° C. by the use of an ice-water bath. After standing for 3 days at room temperature, the reaction mixture was mixed with 200 cc. of benzene and washed with three 400 cc. portions of water. The benzene solution was then distilled to yield 79.2 g. of liquid, B. P. 126°-130° C./1 mm. The crude product was cooled to about 5° C., filtered and the filtrate distilled to yield 43.2 g. of α-chloro-β-dibutylaminoacrylonitrile, a light yellow liquid boiling at 116°-120° C./1 mm., and having a refractive index $n_{23.5}^D$ 1.5068

*Example 6*

26 g. of α,β-dichloroacrylonitrile were slowly added to a mixture of 25 g. of para-chloroaniline, 20 g. of pyridine and 50 cc. of methanol. Very little heat was evolved during the reaction. After standing overnight at room temperature, the mixture was poured into cold water. A dark crystalline mass separated which was filtered off and recrystallized from methanol to yield α-chloro-β-p-chlorophenylaminoacrylonitrile, a light orange-colored product melting at 139°-140° C.

*Example 7*

52 g. of α,β-dichloroacrylonitrile were added during a period of 15 minutes to a mixture of 42.8 g. of methyl aniline, 43 g. of triethyl amine and 100 cc. of methanol. The reaction was rather sluggish and the temperature was easily held below 35° C. After standing for a period of 3 days, the reaction mixture was mixed with 200 cc. of benzene. The benzene solution was washed with several portions of water, and then distilled. The α-chloro-β-methylphenylaminoacrylonitrile was obtained in good yield as a light yellow liquid boiling at 127-130° C./1 mm., and having a refractive index of $n_{23.5}^D$ 1.6240

The β-amino-α-chloroacrylonitrile compounds obtainable in accordance with the present invention are suitable for use as insecticides and as intermediates for the production of pharmaceutical agents and assistants for the textile and related industries.

While the invention has been described with particular reference to specific embodiments, it is to be understood that it is not to be limited thereto but is to be construed broadly and restricted solely by the scope of the appended claims.

I claim:

1. β-amino-α-chloroacrylonitriles of the general formula

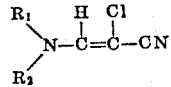

wherein R₁ and R₂ are chosen from the group consisting of hydrogen, alkyl, aryl.

2. A method of producing a β-amino-α-chloroacrylonitrile of the general formula

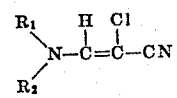

wherein R₁ and R₂ are chosen from the group consisting of hydrogen, alkyl, aryl and combinations thereof, which includes the step of reacting α,β-dichloroacrylonitrile with an ammonia base of the formula.

in which R₁ and R₂ are chosen from the group consisting of hydrogen, alkyl, aryl.

3. The method of claim 2 in which the reaction is carried out in the presence of an inert organic solvent.

4. The method of claim 2 in which the reaction is carried out in the presence of an acceptor for the hydrogen chloride liberated in said reaction.

5. The method of claim 2 in which the reaction is carried out at a temperature not exceeding about 100° C.

6. The method of claim 2 in which the reaction is carried out employing approximately two molecular proportions of ammonia base to one molecular proportion of α,β-dichloroacrylonitrile.

7. A method of producing a β-amino-α-chloroacrylonitrile of the general formula

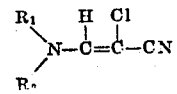

wherein $R_1$ and $R_2$ are chosen from the group consisting of hydrogen, alkyl, aryl, which includes the steps of reacting together α,β-dichloroacrylonitrile and an ammonia base of the formula

wherein $R_1$ and $R_2$ are chosen from the group consisting of hydrogen, alkyl, aryl, at a temperature not exceeding about 100° C. in the presence of an inert organic solvent and a hydrogen chloride acceptor, and recovering the thus-formed β-amino-α-chloroacrylonitrile.

JOHN G. ERICKSON.

REFERENCES CITED

The following references are of record in the file of this patent:

UNITED STATES PATENTS

| Number | Name | Date |
|---|---|---|
| 2,211,152 | Nicodemus et al. | Aug. 13, 1940 |